W. R. & T. S. STEWART.
TIRE.
APPLICATION FILED FEB. 4, 1909.
942,418.
Patented Dec. 7, 1909.
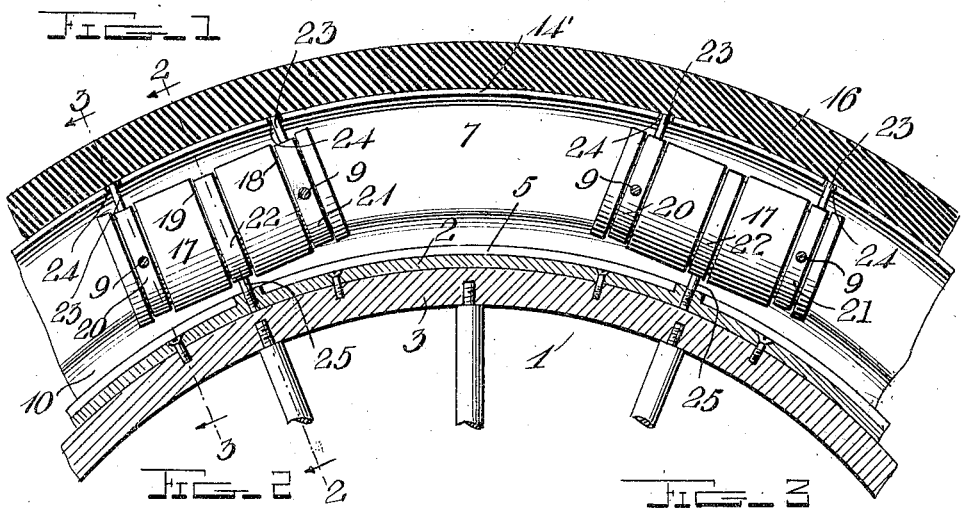
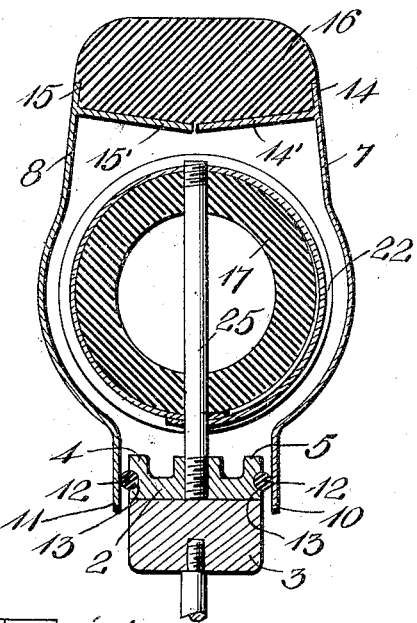
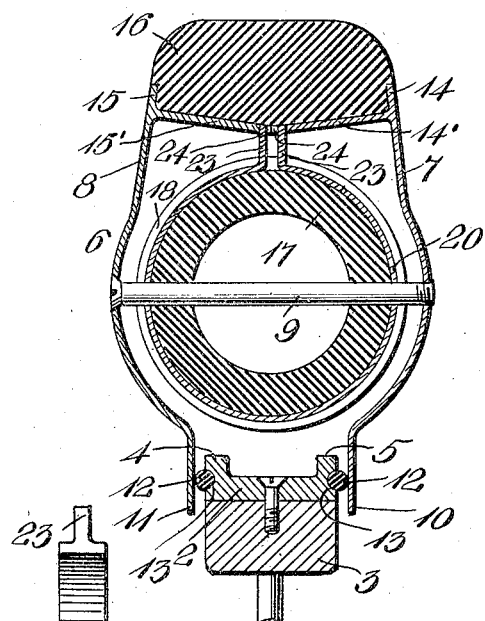
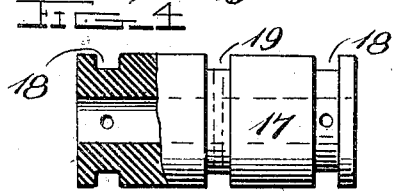
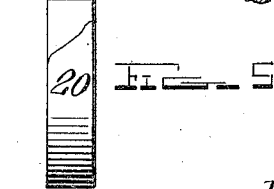
Witnesses
C. H. Griesbauer
Inventors
W. R. Stewart
and T. S. Stewart
by H. B. Willson & Co
Attorneys

UNITED STATES PATENT OFFICE.

WILLIAM R. STEWART AND THOMAS S. STEWART, OF SALTSBURG, PENNSYLVANIA, ASSIGNORS OF ONE-THIRD TO ABRAHAM SAMUEL BRAVERMAN, OF AVONMORE, PENNSYLVANIA.

TIRE.

942,418.

Specification of Letters Patent. Patented Dec. 7, 1909.

Application filed February 4, 1909. Serial No. 476,034

*To all whom it may concern:*

Be it known that we, WILLIAM R. STEWART and THOMAS S. STEWART, citizens of the United States, residing at Saltsburg, in the county of Indiana and State of Pennsylvania, have invented certain new and useful Improvements in Tires; and we do declare the following to be a full, clear, and exact description of the invention, such as will enable others skilled in the art to which it appertains to make and use the same.

This invention relates to tires, especially adapted for use on automobiles.

The object of the invention is to provide a tire which is strong and durable, and which has a perfect spring and cushioning effect.

With this and other objects in view, the invention consists of certain novel features of construction, combination and arrangement of parts, as will be more fully described and particularly pointed out in the appended claims.

In the accompanying drawings: Figure 1 represents a side elevation partly in section of a portion of a wheel with this improved tire applied. Fig. 2 is a transverse section, taken on the line 2—2 of Fig. 1. Fig. 3 is a transverse vertical section taken on line 3—3 of Fig. 1, Fig. 4 is a side elevation partly in section of one of the cushioning cylinders, detached, Fig. 5 is a side elevation of the centrally disposed clamping ring, detached.

In the embodiment illustrated, the wheel 1 is provided with the usual metallic rim mounted on the felly 3. This metallic rim 2 is preferably provided on its opposite edges with annular flanges 4 and 5, which extend outwardly in parallel planes, and form guides for the casing to be described.

A casing 6 is mounted on the tire or rim 2 and comprises two metallic sections 7 and 8, with outwardly bulging sides, as clearly shown in Figs. 2 and 3, and which are connected together with bolts, as 9, which pass transversely through the casing. These sections 7 and 8 are provided, at their inner ends, with depending flanges 10 and 11, which are spaced slightly from the sides of the rim 2, and are adapted to move vertically thereon when the tire is compressed. A packing 12 is preferably arranged between the sides of the rim 2 and the flanges 10 and 11, and is mounted in grooves 13, formed in each side of the rim 2, as is clearly shown in Figs. 2 and 3. The outer portion of the casing formed by sections 7 and 8, is provided with outwardly-extending, parallel flanges 14 and 15, arranged at opposite sides of the casing, and between which on the lateral flanges 14' and 15' which project inwardly to form the periphery of said casing is mounted the ordinary rubber tread or tire 16, which may be secured thereto in any suitable or desired manner. Arranged within the casing 6 are a plurality of spring members 17, each preferably made in the form of a rubber cylinder having peripheral grooves, as 18, at its opposite ends, and a groove 19 at the center thereof. These grooves are designed to receive metallic securing bands 20, 21 and 22, which are clearly shown in Fig. 1. The bands 20 and 21, which pass around the ends of the cylinder and are arranged in the grooves 18, are provided with laterally extending ends, as 23, which are preferably made angular and are adapted to extend into apertures 24 formed in the outer rim which is formed by the periphery of the casing 6. The band 22 which is mounted in the groove 19 of the cylinder 17 is provided with overlapping ends, through which a pin 25 passes. This pin is preferably made screw-threaded at its opposite ends and one end thereof extends into a screw-threaded aperture formed in the rim 2 and its other end engages an aperture in the band 22 diametrically opposite its overlapped ends, and which securely holds the cylinder in position. The pins 9, which pass transversely through the casing 6, also pass through the bands 20 and 21 and through the ends of the cylinder 17.

It will be evident from the construction shown that pressure exerted on the tread 16 of the tire will cause the casing 6 to move inwardly on the guide flanges 4 and 5 of the rim 2, and the rubber cylinders will give a perfect cushioning effect thereto.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

We claim as our invention:

1. A vehicle tire comprising a hollow, annular, metallic casing having outwardly bulged sides and provided with spaced, depending flanges at the inner face thereof, adapted to embrace the sides of a wheel rim, a tread member secured to the periphery of said casing, a plurality of rubber cylinders arranged longitudinally within said casing, and secured thereto.

2. A vehicle tire comprising a hollow, annular, metallic casing having outwardly bulged sides and provided with spaced, depending flanges at the inner face thereof, adapted to embrace the sides of a wheel rim, a tread member secured to the periphery of said casing, a plurality of rubber cylinders arranged longitudinally within said casing, means for securing said cylinders to said casing, and means for securing said cylinders to a wheel rim.

3. The combination with a vehicle wheel having a rim, of a resilient tire comprising a hollow, metallic, annular casing, provided at its inner face with spaced annular flanges adapted to embrace the opposite sides of said rim, a packing arranged between said flanges and said wheel rim, a plurality of cushioning cylinders arranged within said casing, bands extending around the opposite ends of said cylinders and having means for connection with the casing and bands extending around the centers of said cylinders, and provided with means for engaging the wheel rim.

In testimony whereof we have hereunto set our hands in presence of two subscribing witnesses.

WILLIAM R. STEWART.
THOMAS S. STEWART.

Witnesses:
ROBT. H. WILSON,
C. J. MCKEE.